United States Patent Office 2,836,486
Patented May 27, 1958

---

2,836,486

EXOTHERMIC ALLOY ADDITION AGENT

Joseph H. Brennan, Niagara Falls, and Earle R. Saunders, Grand Island, N. Y., assignors to Union Carbide Corporation, a corporation of New York No Drawing. Application March 26, 1954
Serial No. 419,096

2 Claims. (Cl. 75—27)

This invention relates to improved exothermic reaction mixtures, and more particularly concerns improvements in the exothermic ferroalloy addition agents.

It has been known for some time that the temperature drop that accompanies the addition of alloying elements to a steel melt may be reduced to an appreciable extent by the addition of reaction materials having exothermic properties. In the production of steel alloys utilizing such materials, the usual practice is to add an exothermic mixture including the alloying materials to a steel or cast iron melt, and to so proportion the constituents of the exothermic mix that the heat generated is sufficient to substantially reduce the amount of chill that would otherwise result from such alloy addition. The usual exothermic mix consists essentially of an oxidizing agent, a reducing agent, and one or more alloying metals. A common oxidizing agent that is widely used is sodium nitrate; the reducing agent is carbon or silicon, and the alloying material is some form of ferroalloy.

One of the difficulties inherent in a reaction mixture containing sodium nitrate as oxidizing agent and either carbon or silicon as reducing agent is the relatively low heat-developing capacity of the mixture per unit weight. While the heat-generating capacity of silicon itself in combination with sodium nitrate is appreciable, its heating effect in terms of the volumes and weights of materials usually encountered in exothermic mixtures has not been altogether satisfactory because of the relatively large volumes of exothermic material used and the low proportion of ferroalloy material in the reaction mixture. The use of carbon as reducing agent presents even greater difficulties, carbon being only half as effective as silicon in the generation of exothermic heat.

The present invention aims to secure reaction mixtures for steel melts and other uses which are of greater efficiency and economy than those heretofore used, and which can be manufactured easily and comparatively cheaply.

Sodium nitrate reacts with aluminum to produce approximately twice as much useable heat per unit of oxidant as that obtained from the reaction with silicon, or four times that of carbon. Therefore, by using aluminum as reducing agent in a reaction mixture, the amount of oxidant required in the mixture to develop a given amount of heat would be about one-half to one-fourth that usually required, and consequently the proportion of ferroalloy material in the reaction mixture would be materially increased.

It is, therefore, an object of the present invention to provide an improved exothermic ferroalloy reaction mixture containing an oxidizing agent and aluminum as a reducing agent, so that upon igniting the mixture in steel or cast iron, a more efficient propagation of heat is effected.

Another object of the present invention is to provide an improved exothermic ferroalloy reaction mixture containing ferroalloy additives, an oxidizing agent and aluminum as a reducing agent, wherein the proportion of ferroalloy additives is greater than that of any other exothermic ferroalloy reaction mixture heretofore known.

Still another object of the present invention is to provide an improved exothermic ferroalloy reaction mixture including ferroalloy additives, an oxidizing agent, aluminum as a reducing agent, and an accelerator, wherein the accelerator is utilized to control the ignition temperature of the mixture, the rate of heat propagation as a result of said ignition, and the rate of solution of said ferroalloy additives when added to steel or cast iron melts.

The above objects are accomplished by forming an exothermic reaction mixture comprising one or more ferroalloy addition agents, an oxidizing agent, and, as a reducing agent, aluminum. The ferroalloy addition agent may have either a high carbon content or a low carbon content, and may contain any desired constituents for alloying with the metal bath, either low melting metals or refractory metals, as for example metals such as chromium, nickel, cobalt, copper, tungsten, vanadium, titanium, molybdenum, manganese and columbium.

In conventional exothermic mixtures, the oxidizing agents usually encountered comprise such compounds as sodium nitrate, sodium perchlorate or potassium perchlorate. It is sometimes advantageous to incorporate in the mixture some oxidizing agent as sodium chromate or bichromate. Chromate used as oxidant adds chromium to the melt. Sodium nitrate is the preferred oxidizing agent in the present invention.

The aluminum to be used in the exothermic reaction mixture may be in its elemental form or as a constituent of the ferroalloy additive, or as a separate ferroalloy material.

The composition of the reaction mixture may be varied over a considerable range without impairing its exothermic properties. Because of this, the mixture is applicable to a variety of steel-making procedures practiced in different steel mills. For example, in its broadest aspect, a substantial percentage of useable ferroalloy additives may be efficiently incorporated in a steel melt when the exothermic mix composition is within the following range:

| | Percent |
|---|---|
| Sodium nitrate | 5 to 15 |
| Aluminum | 2 to 8 |
| Ferroalloy (including impurities) | Remainder |

The above composition range is based upon the use of stoichiometric proportions of sodium nitrate and aluminum as expressed by the following reaction:

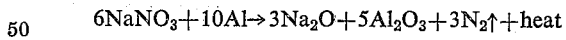

$$6NaNO_3 + 10Al \rightarrow 3Na_2O + 5Al_2O_3 + 3N_2\uparrow + heat$$

Thus, an exothermic mix having a composition within the above range, when added to a steel melt, will generate an amount of heat sufficient to reduce substantially the amount of chill that would otherwise result from a cold, non-exothermic, ferroalloy charge. Because the amount of sodium nitrate to be used in the mix is relatively small, the amount of slag formed is relatively small, and the fume resulting from the mixture reaction is likewise reduced.

As another feature of the present invention, means are employed to control the exothermicity and thereby control the ignition temperature and the rate of solution of the alloy additives in the melt. To this end an accelerator is included as one of the ingredients of the mix. This accelerator may comprise a compound of an alkali or alkaline earth metal, such as lime, cryolite, calcium fluoride, sodium carbonate, sodium silicate, or calcium aluminate. By employing any of these accelerators, either alone or in combination with each other, and varying the percentage of the accelerator in the mix, the rate of propagation of heat is influenced, and also rate of solution of the alloying materials. While the amount of accelerator in an exothermic reaction mixture may vary within wide limits, best results are obtained in the following range of composition:

| | Percent |
|---|---|
| Sodium nitrate | 5 to 15 |
| Aluminum | 2 to 8 |
| Accelerator | Up to 10 |
| Ferroalloy (including impurities) | Balance |

It is desirable that the heat generated by the ignition be released within a sufficiently short time so that the alloy may be dissolved early in the tap and have more opportunity to become uniformly distributed throughout the melt. As an added feature of novelty in the present invention, the following examples listed below in Table I illustrate the wide variance in solution times that may be obtained in adding a ferrochromium alloy to a steel bath, when variously proportioned accelerating agents are included in the alloy mixture.

The data reported are the results of tests in which a sufficient quantity of addition agent was added to a 100 pound bath of molten steel to raise the chromium content of the steel 1%, the bath being at a temperature of about 1600° C. In the table "H. C. FeCr" means high carbon ferrochromium, "L. C. FeCr" means low carbon ferrochromium, and "FeSiCr" refers to a ferro-silicon-chromium alloy.

the present invention also affects the maximum temperature attained in any given composition of the exothermic mixture.

As an illustration of this, Table II below shows the maximum temperature effects of accelerator agents in specific compositions of exothermic mixtures. The data listed in Table II were obtained by the following procedure. Five hundred grams of an exothermic mixture (aluminum plus sodium nitrate plus ferroalloy plus accelerators) were placed in a fire clay crucible with a thermocouple buried in the mixture. The mixture was ignited by means of a magnesium powder fuse, and the maximum temperature recorded.

TABLE II

| Composition of Reaction Mixture | | | | | Max. Temp., °C. |
|---|---|---|---|---|---|
| Percent Ferroalloy | Percent Al | Percent NaNO₃ | Accelerators, percent | | |
| 89.3 (H. C. FeCr base) | 3.7 | 7.0 | None | | 750 |
| 83.5 (H. C. FeCr base) | 3.7 | 7.0 | Lime / Cryolite | 0.8 / 5.0 | 1,210 |
| 86.0 (H. C. FeCr base) | 3.7 | 7.0 | Lime / CaF₂ | 0.8 / 2.5 | 1015 |
| 83.5 (H. C. FeCr base) | 3.7 | 7.0 | Lime / CaF₂ / Calcium aluminate Cement | 0.8 / 3.0 / 2.0 | 1,230 |
| 83.5 (H. C. FeCr base) | 3.7 | 7.0 | Lime / CaF₂ / Na₂CO₃ | 0.8 / 3.0 / 2.0 | 1,270 |
| 86.5 (H. C. FeCr base) | 3.7 | 7.0 | Lime / Na₂CO₃ | 0.8 / 2.0 | 1,140–1,230 |
| 83.5 (H. C. FeCr base) | 3.7 | 7.0 | Lime / Calcium aluminate Cement | 0.8 / 5.0 | 1,030–1,280 |
| 84.8 (H. C. FeCr base) | 4.2 | 8.0 | Na₂CO₃ | 3.0 | 1,360 |
| 86.5 (FeSiCr base) | 3.7 | 7.0 | Lime / CaF₂ | 0.8 / 2.0 | 1,135–1,170 |
| 85.5 (FeSiCr base) | 3.7 | 7.0 | Lime / CaF₂ | 0.8 / 3.0 | 1,205 |
| 89.3 (L. C. FeCr base) | 3.7 | 7.0 | None | | 970–1,030 |
| 84.3 (L. C. FeCr base) | 3.7 | 7.0 | CaF₂ | 5.0 | 1,210–1,230 |

The increase in the maximum temperature resulting from the inclusion of an accelerator in the mix of the invention can be utilized to improve the useful alloy content of the mixture. In order to increase the useful alloy content, further quantities of alloy material may be added to the mixture to absorb the heat released. In the present instance the alloy content of the mix may be increased to the degree that the mixture is still capable upon ignition in the melt to propagate sufficient heat to permit the addition of alloys without causing an objectionable temperature drop in the melt. This high proportion of useful alloy content means that the total weight of material to be added to the melt may be held to a minimum, thereby avoiding the formation of a bulky

TABLE I

*Rate of solution data*

| Composition of Addition Agent | | | | | Solution Time (Sec.) |
|---|---|---|---|---|---|
| Percent Ferroalloy | Percent Al | Percent NaNO₃ | Accelerators, percent | | |
| 89.3 (H. C. FeCr base) | 3.7 | 7.0 | None | | 65–80 |
| 83.5 (H. C. FeCr base) | 3.7 | 7.0 | Lime / Cryolite | 0.8 / 5.0 | 18–20 |
| 83.5 (H. C. FeCr base) | 3.7 | 7.0 | Lime / CaF₂ | 0.8 / 5.0 | 20–22 |
| 82.3 (H. C. FeCr base) | 3.7 | 7.0 | CaF₂ / "Lumnite" Cement¹ / Na₂SiO₃ | 3.0 / 2.0 / 2.0 | 16 |
| 84.3 (H. C. FeCr base) | 3.7 | 7.0 | CaF₂ / "Lumnite" Cement | 3.0 / 2.0 | 24 |
| 82.8 (H. C. FeCr base) | 4.2 | 8.0 | CaF₂ | 5.0 | 16 |
| 82.8 (H. C. FeCr base) | 4.2 | 8.0 | CaF₂ / "Lumnite" Cement | 3.0 / 2.0 | 24 |
| 82.8 (FeSiCr base) | 4.2 | 8.0 | CaF₂ | 5.0 | 18 |
| 80.7 (L. C. FeCr base) | 5.3 | 10.0 | CaF₂ | 4.0 | 10 |

¹ "Lumnite" cement is the trade designation of a cement composed essentially of calcium aluminate.

Aside from the influence the accelerator has over the rate of solution of the mixture alloy, the accelerator of slag, and lessening the possibility of formation of skull in the ladle when the mix is used as a ladle addition agent.

Upon the basis of experimental results utilizing a mix embodying this invention, recoveries of alloy content above 90% have been achieved. As an example of these excellent recoveries, the following may be cited: A furnace addition of a mix was made to a one-ton, electric arc furnace steel heat. The addition agent comprised a high carbon ferrochrome base containing 8.0% sodium nitrate, 4.3% aluminum in a ferrochrome-aluminum alloy, 0.9% calcium oxide and 4.0% calcium fluoride. Before the addition of the alloying material the melt analysis was as follows: .12% chromium, 0.07% carbon and 0.008% aluminum. After incorporating the addition in the steel melt, an analysis revealed 1.95% chromium, 0.19% carbon and 0.016% aluminum, indicating a 99% chromium recovery and a 90% carbon recovery.

This test demonstrates that substantially all of the exothermic reaction occurred between the aluminum and sodium nitrate as evidenced by the high level of carbon and chromium, and the low recovery of aluminum in the steel.

Even in the presence of large excesses and high concentrations of silicon, the sodium nitrate reacts preferentially with aluminum. This is amply illustrated in the following test, which is substantially similar to the above one-ton electric arc furnace test.

An addition agent comprising a ferrosiliconchromium base containing 8.0% sodium nitrate and 5.0% calcium fluoride was introduced into a steel melt. Analysis of the melt before the addition was 0.07% chromium, 0.19% carbon, 0.24% silicon and 0.11% aluminum. After the addition, analysis of a sample of the melt was as follows: 0.98% chromium, 0.18% carbon, 0.72% silicon and 0.09% aluminum, indicating a chromium recovery of 96% and a silicon recovery of 84%.

It should be observed that from the standpoint of safety considerations, it is necessary that the ignition temperature of the reaction be sufficiently high so that sparks or the ambient temperatures encountered in steel melting shops will not prematurely initiate the exothermic reaction. On the other hand, neither must the reaction once started, be consummated with such violence as to create a hazardous condition as by ejecting molten metal from the ladle during the addition operation. The possibility of an undesirably early ignition is avoided in the subject reaction mixture by judiciously proportioning the ingredients of the mix. The nature and percentage of the accelerator employed in the mix also influence the temperature at which ignition occurs.

As an example of the effect of an accelerator on the ignition temperature, a high carbon ferrochrome base reaction mixture containing 3.7% aluminum, 7.0% $NaNO_3$, and 0.8% lime as an accelerator, was ignited under test conditions at a temperature of 850° C. Upon the addition of 5.0% cryolite and a corresponding reduction in the amount of the high carbon ferrochrome alloy in the reaction mixture, the ignition temperature was reduced to 300° C.

Test results show the steel cast, after employing the exothermic reaction mixture of the present invention, to be substantially uniform in composition, with only slight differences in composition occurring between the first and last casts from a teeming ladle.

The reaction mixture may be conveniently formed into suitably compacted shapes, preferably briquettes, to obtain improved reaction between the mixture ingredients and to facilitate the handling thereof in either the shipping or storage stages or in administering it to a steel melt. To do this, the aluminum and ferroalloy constituents are first finely ground and mixed together with powdered sodium nitrate until a substantially homogeneous dry mixture is attained. A compact of this mix may then be bonded in any one of several ways.

In a preferred bonding procedure, approximately 4% to 5% water is added to the dry mixture to dissolve a substantial part of the sodium nitrate and to impart some degree of plasticity to the mixture. A suitable amount of cementing material is added to improve the bond. The moistened ingredients are then compacted into briquette form. The briquets are dried by heating to about 200° C. to 250° C. As the water evaporates from the briquette, bonding is obtained through the recrystallization of that portion of the sodium nitrate which had previously dissolved in the added water.

If desired, a small amount (approximately 2%) of sodium silicate or an organic binder (such as sugar or products derived from cereal manufacture) may be added to the mix to improve the green and dry strength of the briquettes. Calcium aluminate or calcium aluminate cement may be used as part of the accelerator to improve dry strength. After forming, the briquettes may be dried at temperatures less than the ignition temperature of the mix, which ignition temperatures may vary from about 300° C. to about 900° C. The dry strength of the briquettes thus produced is sufficient to prevent any objectionable amount of fragmentation during normal handling in shipping and storage prior to use in the steel plant.

As an alternative to heating the moistened briquette at 200° C. to 250° C., the briquette may be dried at approximately 300° C. to 350° C. In this range, the sodium nitrate fuses, and bonding is accomplished upon subsequent cooling of the briquette due to the resolidification of the sodium nitrate.

Although several bonding techniques are described, it is to be understood that the mix of the present invention is not to be limited to the particular manner of bonding. For instance, the instant mix may be used in unbonded form or in cake form bonded by a wood rosin or resin, if so desired.

In practicing the present invention in the production of steels such as chromium steel, a bath of molten steel is prepared in the usual manner and brought to a temperature of approximately 1600° C. The proper amounts of alloying materials, based on previous computations, are then administered to the melt in the form of briquettes and allowed to pass into solution as by placing the briquettes in a ladle prior to tapping, following normal steel practice. As a result of the exothermic character of the reaction mixture, heat is generated to assist the rapid solution of the ferroalloy and to prevent an objectionable temperature drop in the steel. Due principally to proper control of the accelerators, the ferroalloy is dissolved during the first part of the tap, and uniformly dispersed by the turbulent action during the remainder of the tap. At the end of the tap, the steel is poured in conventional manner.

It may be desirable in manufacturing a chromium steel to employ an oxidizing agent containing chromium in lieu of sodium nitrate as part of the exothermic mixture. Sodium chromate and sodium bichromate are suitable materials for this purpose, both being capable of reacting exothermically with aluminum to produce relatively high reaction temperatures. Preferably sodium bichromate is used along with a component such as calcium fluoride as an accelerator to regulate and adjust the ignition temperature and solution rate.

Exothermic mixtures of the aluminum-sodium bichromate type may be prepared in substantially the same manner as the previously described briquettes of the aluminum-sodium nitrate type. Aluminum, in the form of a ferrochromium aluminum alloy is pulverized to 100 mesh size (0.147 mm. openings). Following this step, sodium bichromate, ground to 20 mesh size (0.833 mm. openings) is mixed with the powdered aluminum alloy in stoichiometric proportions to produce the following exothermic reaction:

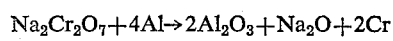
$$Na_2Cr_2O_7 + 4Al \rightarrow 2Al_2O_3 + Na_2O + 2Cr$$

The thus formed mixture is enhanced with an accelerator, preferably fluorspar, reduced to 100 mesh size. The accelerator comprises approximately 5% of the dry mix weight. A compact of this mix may then be bonded in any one of the previously described methods. For instance, water may be added in an amount sufficient to dissolve the sodium bichromate compound. Following this step, the plasticized mix is formed into briquettes, and is ready to be dried. Drying is carried out by heating to about 200° C. to 250° C. for approximately two hours. Acceptable ranges of composition of these exothermic mixtures for substantially complete reaction between the aluminum and the sodium bichromate are as follows:

| Ingredient | Max. Range, Percent | Preferred Range, Percent |
| --- | --- | --- |
| $Na_2Cr_2O_7$ | 5–20 | 7–12 |
| Aluminum | 2–8 | 3–5 |
| $CaF_2$ | up to 10 | 4–8 |
| Ferroalloy (including usual impurities) | balance | balance |

Briquettes manufactured in the above manner have given satisfactory solution rates. As a specific example, briquettes having a composition of 10% sodium bichromate, aluminum in the form of a ferrochromium aluminum alloy containing 50% aluminum and in a theoretical amount sufficient to completely react with the sodium bichromate, and calcium fluoride in an amount equal to 5% of the dry mix weight, have given a solution rate of 45 seconds for a 1% chrome addition to a steel bath at 1600° C.

Recovery data obtained as a result of the test in which ferrochrome base alloy briquettes were added to a steel bath to raise the chromium content of the bath 1%, the bath being at a temperature of about 1600° C., are given below in Table III. The briquettes were prepared from reaction mixes having the following composition:

MIXTURE

| | Percent |
| --- | --- |
| High carbon ferrochromium | 58.3 |
| Ferrochromium-aluminum alloy | 23.3 |
| Sodium bichromate | 11.4 |
| Accelerator | 7.0 |
| Total | 100.0 |

Except for the particular type of accelerator employed in the mix, both mixes were identical to each other in every respect. In calculating the recoveries, the chromium and the sodium bichromate were included as part of the chromium feed.

TABLE III

| Briquet Type | Accelerator | Ferroalloy Base |
| --- | --- | --- |
| A | Calcium Fluoride | High Carbon Ferrochromium |
| B | Cryolite | Do. |

| Briquet Type | Percent Composition of Steel Melt | | | | Percent Indicated Recovery | | | |
| --- | --- | --- | --- | --- | --- | --- | --- | --- |
| | Cr | C | Si | Al | Cr | C | Si | Al |
| A (1)* | 0.12 | 0.18 | 0.10 | 0.04 | | | | |
| A (2)** | 1.08 | 0.24 | 0.07 | 0.03 | 96 | 90 | | None |
| B (1) | 0.07 | 0.18 | 0.10 | 0.02 | | | | |
| B (2) | 1.08 | 0.24 | 0.07 | 0.02 | 96 | 90 | | None |

*(1) Before briquet addition.
**(2) After briquet addition.

Similar excellent results were obtained with other ferroalloys as base component. Data shown below for a ferrosilicon-chromium (approximately 30% Si, 52% Cr) base mixture demonstrate that the aluminum-bichromate reaction proceeds in the presence of a large excess of silicon.

MIXTURE

| | Percent |
| --- | --- |
| Ferrosilicon-chromium | 53.6 |
| Ferrosilicon-chromium-aluminum | 28.0 |
| Sodium bichromate | 11.4 |
| Accelerator (calcium fluoride) | 7.0 |
| Total | 100.0 |

Test data from a 100 pound steel heat follow:

| | Percent Composition of steel Melt | | | Percent Indicated Recovery | | | |
| --- | --- | --- | --- | --- | --- | --- | --- |
| | Cr | Si | Al | Cr | C | Si | Al |
| Before Addition | 0.03 | 0.14 | 0.04 | | | | |
| After Addition | 1.05 | 0.68 | 0.05 | 100 | | 100 | 10 |

The above data indicate excellent recovery of chromium averaging 96% or better, and demonstrate that even in the presence of high concentrations of carbon and silicon in the briquette mix, the exothermic reaction occurs between the aluminum and the sodium bichromate, as evidenced by the high carbon and silicon recoveries with very little or no recovery of aluminum. Moreover, briquettes of the aluminum-sodium bichromate type having a ferrosilicon chromium base ignite above 400° C. and take about 25 to 45 seconds for the exothermic reaction to subside and for the alloy additions to be assimilated in the steel melt. The high carbon ferrochrome base compacts are stable up to 600° C.

The present invention meets the exacting requirements of present day exothermic reaction mixtures, having a relatively high ignition temperature, and being capable of releasing a sufficient amount of heat to prevent excessive temperature drop of the steel when the steel is tapped into the ladle. In addition to the exothermic characteristics of the instant invention, its use results in the following advantages:

(A) The heat generated is propagated within a sufficiently short time ranging from about 10 seconds to 45 seconds so that the ferroalloy is dissolved early in the tap and becomes uniformly distributed therein.

(B) The amount of slag formed is relatively small and fluid.

(C) The amount of fume, if any, generated by the chemical reaction is of small consequence.

(D) The weight of the material to be added is held to a minimum because of the high proportion of useful alloy in the reaction mixture.

(E) The recovery of the alloy is relatively high, and its assimilation in the steel melt is uniform.

It is to be understood that modifications and variations may be effected without departing from the scope of the novel concepts of the present invention.

What is claimed is:

1. A ferroalloy mixture for addition to molten steel comprising 5 to 15% sodium nitrate, 2 to 8% aluminum, up to 10% of at least one accelerator material selected from the group consisting of lime, cryolite, calcium fluoride, sodium carbonate, sodium silicate and calcium aluminate, the remainder ferroalloy, and characterized by relatively high exothermicity and fast solution rate, said mixture components being intimately associated in homogeneous relationship.

2. In the manufacture of alloy steels, the improvement which comprises preparing a bath of molten steel, adding to said bath an exothermic reaction mixture which comprises 5 to 15% sodium nitrate, 2 to 8% aluminum, up to 10% of at least one accelerator selected from the group consisting of lime, cryolite, calcium fluoride, sodium carbonate, sodium silicate, and calcium aluminate, the remainder ferroalloy, thereby providing in said bath said ferroalloy and an amount of heat sufficient to reduce substantially the amount of chill that would result from cold, non-exothermic ferroalloy addition.

References Cited in the file of this patent

UNITED STATES PATENTS

| 1,835,925 | Becket | Dec. 8, 1931 |
| 2,281,216 | Udy | Apr. 28, 1942 |

FOREIGN PATENTS

| 498,902 | Canada | Dec. 29, 1953 |
| 184,843 | Great Britain | Aug. 23, 1922 |
| 679,435 | Great Britain | Sept. 17, 1952 |